(12) United States Patent
Ablabutyan

(10) Patent No.: US 8,198,981 B2
(45) Date of Patent: Jun. 12, 2012

(54) WIRELESS LIFT GATE CONTROL SYSTEM INCLUDING AUTHORIZATION OF OPERATOR

(75) Inventor: Karapet Ablabutyan, Glendale, CA (US)

(73) Assignee: RS Drawings, LLC, Santa Fe Springs, CA (US)

( * ) Notice: Subject to any disclaimer, the term of this patent is extended or adjusted under 35 U.S.C. 154(b) by 492 days.

(21) Appl. No.: 12/466,278

(22) Filed: May 14, 2009

(65) Prior Publication Data
US 2010/0293611 A1 Nov. 18, 2010

(51) Int. Cl.
*G08B 21/00* (2006.01)
(52) U.S. Cl. ......................................... 340/5.2; 318/466
(58) Field of Classification Search .................... 340/5.2, 340/5.1, 5.21, 5.22, 5.23, 5.64, 5.7, 5.72; 318/466; 49/281
See application file for complete search history.

(56) References Cited

U.S. PATENT DOCUMENTS

| | | | |
|---|---|---|---|
| 5,851,050 A | 12/1998 | Squire et al. | |
| 6,411,054 B1 | 6/2002 | Van Wiemeersch | |
| 7,111,174 B2 | 9/2006 | Hamid | |
| 7,385,484 B2 | 6/2008 | Nath et al. | |
| 7,397,363 B2 | 7/2008 | Joao | |
| 7,463,896 B2 | 12/2008 | Himmelstein | |
| 2003/0044266 A1 | 3/2003 | Vandillen et al. | |
| 2006/0071553 A1 | 4/2006 | Lengacher et al. | |
| 2007/0273478 A1 | 11/2007 | Chevalier | |
| 2008/0129445 A1 | 6/2008 | Kraimer et al. | |
| 2008/0143280 A1 | 6/2008 | Rock | |
| 2009/0128356 A1 | 5/2009 | Nitta et al. | |

OTHER PUBLICATIONS

Notification of Transmittal of the International Search Authority, International Search Report and the Written Opinion dated Jul. 9, 2010 for International Application No. PCT/US2010/034786 from the International Searching Authority, filed May 13, 2010, pp. 1-3.
Notification Concerning Transmittal of International Preliminary Report on Patentability dated Nov. 24, 2011 for International Application No. PCT/US2010/034786 from the International Bureau, filed May 13, 2010, pp. 1-10, Geneva, Switzerland.

*Primary Examiner* — Jeffery Hofsass
(74) *Attorney, Agent, or Firm* — Michael Zarrabian, Esq.; Sherman & Zarrabian LLP

(57) ABSTRACT

A lift gate system is provided which in one implementation has a lift gate assembly including an actuator for actuating a lift gate, a main controller configured for controlling the actuator, and a wireless transceiver for receiving an operation command. The system further has a wireless controller including an authorization controller configured for checking that an operator is authorized to operate the lift gate, the wireless controller configured such that upon authorization of the operator by the authorization controller, the wireless controller may wirelessly transmit an operator command to the main controller for controlling operation of the lift gate accordingly.

32 Claims, 6 Drawing Sheets

WIRELESS LIFT GATE CONTROL SYSTEM INCLUDING AUTHORIZATION OF OPERATOR

BACKGROUND OF THE INVENTION

The present invention relates generally to controllers, and in particular, to controllers for lifts such as lift gates or wheelchair lifts.

Lift gates are typically mounted at a structure such as the rear of a vehicle to lift payloads on a platform from one level (e.g., ground level) up to another level (e.g., the bed of the vehicle), or vice versa.

One type of lift gate employs linkages to maintain the lift platform in a horizontal plane through the lifting range. The lift platform is attached to linkages by pivot members, which allow the lift platform to be pivoted. When in the vertical position, operation of the lifting mechanism rotates the lift platform into an inverted, stowed position beneath the vehicle body. Hydraulic actuators and electric actuators are used to provide lifting force for moving the lift. Another type of lift gate is a rail lift gate. Regardless of the mechanical structure of the lift gate, to control the motion of the lift, toggle switches are wired to the actuators for controlling motion of the lift by an operator interacting with the wired toggle switches.

BRIEF SUMMARY OF THE INVENTION

The present invention provides a lift gate system, which in one embodiment comprises a lift gate assembly including an actuator for actuating a lift gate, a main controller configured for controlling the actuator, and a wireless transceiver for receiving an operation command. The system further includes a wireless controller including an authorization controller configured for checking that an operator is authorized to operate the lift gate, the wireless controller configured such that upon authorization of the operator by the authorization controller, the wireless controller may wirelessly transmit an operator command to the main controller for controlling operation of the lift gate accordingly. The wireless controller may further include an operator interface for receiving authorization information from the operator, the authorization controller is further configured for checking the authorization information to determine that the operator is authorized to operate the lift gate.

The authorization information may include one or more of: an indication of a code entered on a key pad, an indication of unlocking of a lock by a key, an indication of swiping of an information card on a card reader, and an indication of receiving a specific wireless signal from a wireless transmitter.

The authorization controller may further be configured for determining an authorization level for the operator based on the authorization information, the authorization level indicating the types of lift gate operations the operator is authorized to perform on the lift gate by commanding the wireless controller.

The authorization controller may further be configured to check that one or more conditions are satisfied, and the wireless controller may further be configured such that upon authorization of the operator by the authorization controller, and satisfaction of said one or more conditions, the wireless controller may wirelessly transmit the operator command to the main controller for controlling operation of the lift gate accordingly.

The main controller may be further configured to check that one or more conditions are satisfied, and upon satisfaction of said one or more conditions, then upon receiving a command from the wireless controller the main controller controls operation of the lift gate accordingly.

The system may further include a wireless auxiliary switch configured for wirelessly receiving an authorized operator command from the wireless controller for controlling up/down motion of a lift platform via the actuator.

These and other features, aspects and advantages of the present invention will become understood with reference to the following description, appended claims and accompanying figures.

DETAILED DESCRIPTION OF THE INVENTION

The present invention provides a method and system for wireless control of a lift gate. One embodiment involves a controller that provides wireless control and monitoring of the motion of a lift platform of a lift gate. The invention is applicable to different types of lift gates, and not limited to the example embodiments described herein.

Figure 1:
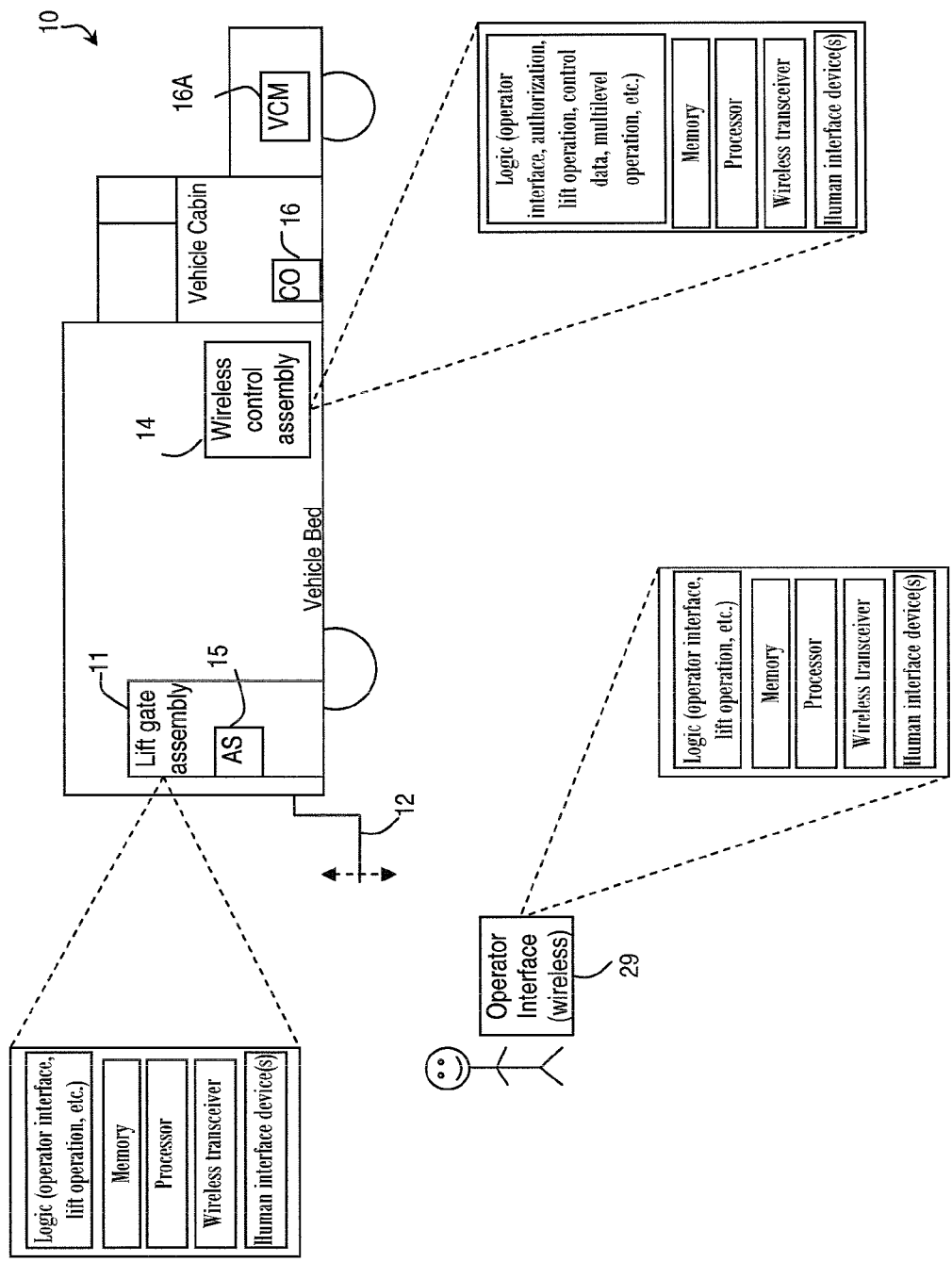
FIG. 1 shows a block diagram of a vehicle with a lift gate assembly that is controlled by a wireless control assembly, according to an embodiment of the invention.

FIG. 1 shows a block diagram of a vehicle 10 with a lift gate assembly 11 for operating a lift platform 12, wherein the lift gate assembly 11 is controlled by a wireless control assembly 14, according to an embodiment of the invention. The lift gate assembly 11 and the wireless control assembly 14 may be powered by an electrical power source on the vehicle and/or their own power sources (e.g., batteries). A human operator may interact with the wireless control assembly 14 to wirelessly control the operation of the lift gate assembly 11 via the wireless control assembly 14.

The wireless control assembly 14 initially prompts the operator to demonstrate that the operator is authorized to operate the lift gate assembly 11. For example, the wireless control assembly 14 may prompt the operator to provide authorization information directly into a wired operator interface module 27 (FIG. 2) of the wireless control assembly 14, or via a remote operator interface module 29 which wirelessly communicates with the wireless control assembly 14. The operator may for example swipe a card through a card reader, or enter a code on a keypad, or use a key, or press a button (as in a key fob) to wirelessly transmit a particular signal recognized by the wireless control assembly 14. Other methods of demonstrating that the operator is authorized may be utilized.

In one embodiment, the wireless control assembly 14 is hard wired to the vehicle 10 and the wireless operator interface module 29 is portable (as in a remote control). In another embodiment, the wireless control assembly 14 itself is not hard wired to the vehicle 10 and is portable (as in a remote control, including a power source such as a battery). The operator enters information directly into the wired operator interface module 27 of such a portable wireless control assembly 14 for authorization and wireless control of the lift gate assembly 11, as described herein. In this case, use of the remote operator human interface module 29 is optional.

As described in more detail further below, upon authorizing the operator based on the authorization information provided by the operator, the wireless control assembly 14 allows the operator to enter inputs to the wireless control assembly 14 to wirelessly control the operation of the lift gate assembly 11.

A cut off switch (CO) 16 may be configured to disable/enable operation of the wireless control assembly 14 altogether as needed. The cut off switch 16 may be located in the cabin of the vehicle and may communicate with the wireless control assembly 14 in a wired or wireless manner. The cut off switch 16 may also disable/enable operation of the lift gate assembly 11 via wired/wireless communication therewith. The CO switch 16 can be operated by an operator and may require the operator to demonstrate that the operator has authority (e.g., enter a code on a key pad) to operate the cut off switch. Communications between the CO switch 16 and other components may be coded (encoded).

The lift gate assembly 11 may also include a runner or auxiliary switch (AS) 15 as shown in FIG. 1, which receives input commands from an operator and wirelessly transmits platform up/down commands to the lift gate assembly 11 via the wireless control assembly 14.

Optionally, a vehicle control management (VCM) module 16A that controls the operation of various components of the vehicle (e.g., engine, transmission, starter), is connected to the wireless control assembly 14 (FIG. 2) via a communication line to provide an interlock function. When the lift gate assembly 11 indicates that the lift gate is in a certain state (e.g., position), the VCM 16A controls operation of the vehicle accordingly. For example, when the lift gate assembly 11 indicates that the lift gate platform is lowered, the VCM 16A prevents the vehicle engine from being started or prevents the transmission from selecting a drive gear.

Similarly, when the VCM 16A indicates that the vehicle is in a certain state, the lift gate assembly 11 controls operation of the lift gate accordingly. For example, when the VCM 16A indicates the engine is running or the vehicle transmission is in a drive gear, the lift gate assembly 11 prevents the lift gate platform from being lowered.

Figure 2:
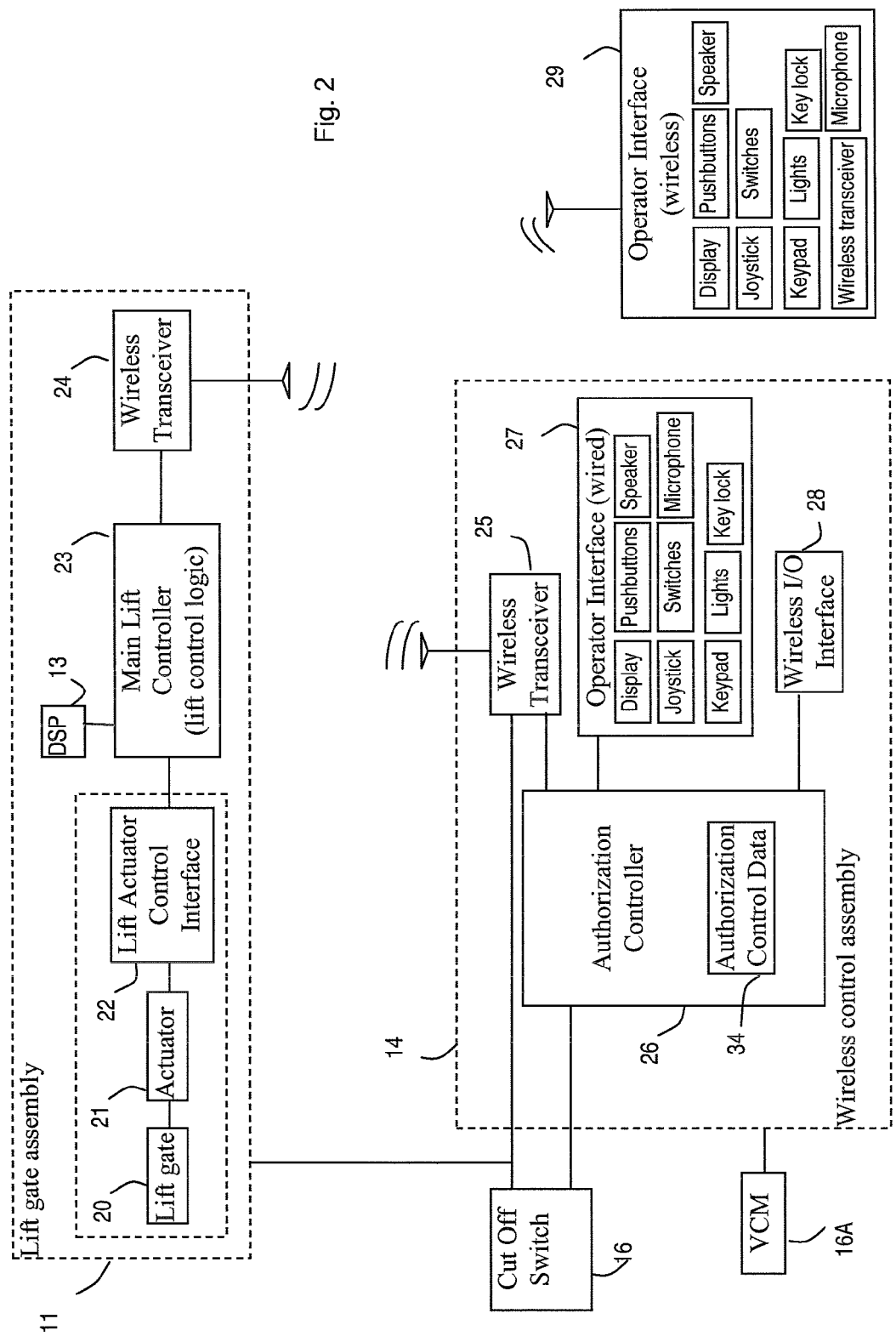
FIG. 2 shows a functional system block diagram of the lift gate assembly and the wireless control assembly, according to an embodiment of the invention.

Now also referring to FIG. 2, a functional system block diagram of an embodiment of the lift gate assembly 11 and the wireless control assembly 14 is displayed. In this embodiment, the lift gate assembly 11 includes a lift gate 20 providing mechanical support for the lift platform, an actuator 21 such as an electric or hydraulic pump for actuating the lift gate 20 based on control signals from an actuator interface 22. The actuator interface 22 receives lift control logic signals from a main lift controller 23 and based on the logic signals provides suitable signals to the actuator 21 for actuating the lift gate 20. The lift gate 20 and actuator 21 can be of types known to those skilled in the art.

In this embodiment of the invention, the main lift controller 23 wirelessly receives lift operation commands from the wireless control assembly 14. The lift gate assembly 11 includes a wireless transceiver 24 operating on one or more radio frequencies (R/F), and exchanges information (e.g., commands, data, signals) with a similar wireless transceiver 25 in the wireless lift control assembly 14. Infrared (I/R) waves may also be utilized, however R/F is preferred.

The wireless control assembly 14 further includes an authorization controller 26 which controls authorization for operation of the lift gate 20. The authorization controller 26 may receive operator authorization information from the wireless operator interface module 29 and/or from the wired operator interface module 27. The authorization controller 26 utilizes such received authorization information to authorize the operator to operate the lift gate 20 based on predetermined criteria indicated by pre-defined authorization control data 34.

Based on the authorization control data 34, certain operators may only be authorized to control selected operations of the lift gate and not others, while other operators may be authorized to control all operations of the lift gate, and still other operators may not be authorized to operate the lift gate at all.

The pre-defined authorization control data 34 may be implemented as a database or table including multiple data entries wherein each entry relates to a corresponding operator. An example of the authorization control data 34 is shown in Table 1 below:

TABLE 1

Authorization Control Data Table

| Authorization Data | Authorization Level |
|---|---|
| Code 1112 | Lift up/down & diagnostic permissions |
| Code 1225 | Lift up/down permissions |
| Code 2212 | All permissions |
| ... | ... |

For example, when an operator inputs a code to the wireless control assembly 14 (via the interface 27 or interface 29), the authorization controller 26 checks the entered code against the authorization data codes in the authorization control data table (e.g., codes 1112, 1225, 2212, etc.). If there is a match, then the authorization controller 26 allows the operator to operate the lift gate 20 based on authorization level granted for the matched code. Based on the authorization level for the matched code the wireless control assembly 14 wirelessly transmits permitted operator lift commands from the interfaces 27 or 29 or AS 15, to the main lift controller 23. Otherwise, if the entered code does not match any code in the authorization control data table, the authorization controller 26 does not permit operation of the lift gate 20 by that operator.

Another example of the authorization control data 34 is shown in Table 2 below:

TABLE 2

Authorization Control Data Table

| Operator Identification | Authorization Data | Authorization Level |
|---|---|---|
| John | Code 1112 | Lift up/down & diagnostic permissions |
| Mary | Code 1225 | Lift up/down permissions |
| Sam | Code 2212 | All permissions |
| ... | ... | |

In this example an operator first enters identification information to the wireless control assembly 14 (via the interface 27 or interface 29) which identifies the operator as operator John. When operator John inputs a code to the wireless control assembly 14 (via the interface 27 or interface 29), the authorization controller 26 checks the entered code against the expected authorization data code 1112 in the authorization control data table. If they match, then the authorization controller 26 allows operator John to operate the lift gate 20 based on authorization level granted to operator John. Specifically, based on the matched code, the wireless control assembly 14 wirelessly transmits permitted operator commands from the operator interfaces 27 or 29 or AS 15, to the main lift controller 23. Otherwise, if the entered code does not match the expected code in the authorization control data table, the authorization controller 26 does not permit operation of the lift gate 20 by the operator. Other types of information for the authorization control data 34 may be utilized, a few additional examples of which are described further below.

The wired operator interface module 27 and the wireless operator interface module 29 may include input interfaces such as a key pad, a card reader, a touch screen, etc., to allow the operator to enter information into the authorization controller 26. The operator interface modules 27 and 29 and the AS 15 may include controls in the form of buttons, switches, joystick or other controls, allowing the operator to provide commands for operation of the lift gate. The operator interface modules 27 and 29 may further include one or more output devices such as signal lights, display screen, or the like for display of information to a user. The authorization controller 26 may display information to the user using the display devices of the operator interface modules. The operator interface modules 27 and 29 may also be configured such that the operator uses the same input devices for both entering authentication information and providing commands for operating the lift gate.

The wired operator interface module 27 may be positioned on the vehicle at the curb side rear of the vehicle, etc. In this example, the wired operator interface module 27 is a component of the wireless assembly controller 14. In another example, the wired operator interface module 27 may be a component of the lift gate main controller 23.

In one embodiment, the wireless operator interface 29 provides one or more of the functionalities of the wired operator interface 27, and communicates with the authorization controller 26 wirelessly via a wireless I/O interface 28 of the wireless control assembly. The wireless operator interface 29 may wirelessly communicate with the authorization controller 26 via the wireless transceiver 25, in which case the wireless I/O interface 28 need not be included/used.

Figure 3:
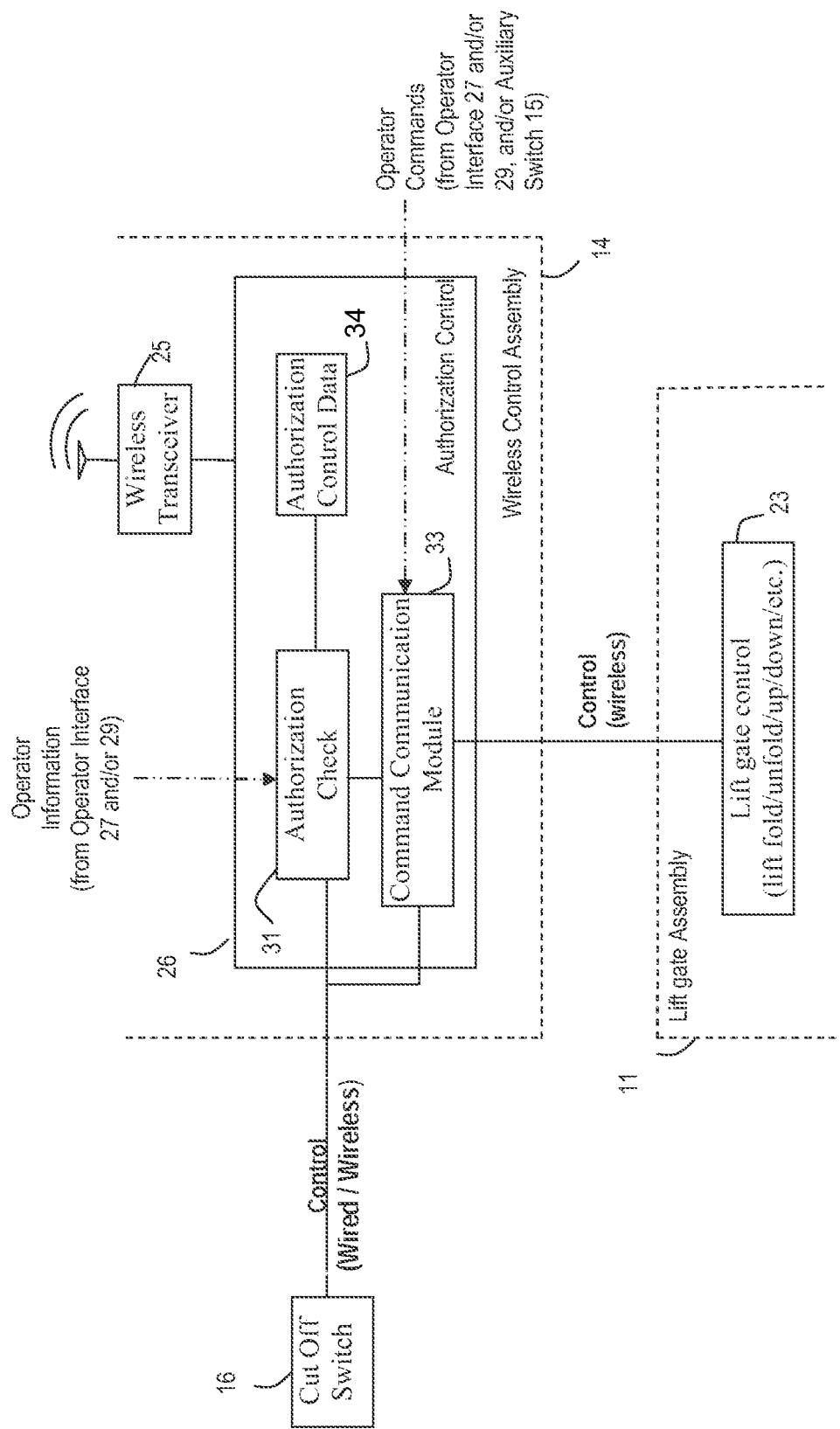
FIG. 3 shows an example operation of an authorization controller of the wireless control assembly in conjunction with the lift gate assembly, according to an embodiment of the invention.

Now also referring to FIG. 3, an example operation of the authorization controller 26 of the wireless control assembly 14 in conjunction with the lift gate assembly 11 is shown and described below. The authorization controller 26 includes an authorization check module 31 which receives operator information (including authorization information) from the wired operator interface 27 (and/or the wireless operator interface 29), and accesses said authorization control data 34 (e.g., the authorization controller looks up the operator information in an authorization data table having an entry for each authorized operator) which may be stored e.g., in a memory device. In this example, the authorization information may include, for example, one or more of: an indication of a code entered on a key pad, an indication of unlocking of a lock by a key, an indication of swiping of an information card on a card reader, and an indication of receiving a specific wireless signal from a wireless transmitter. The authorization control data may be programmable and may be revised as needed. Although the authorization control data is shown in this example to be stored in the memory, in another embodiment of the invention the authorization control data may be stored external to the wireless control assembly 14 (e.g., in a remote database or server) for access by the authorization check module 31 (e.g., via a wireless link).

The authorization check module 31 uses operator/authorization information for the operator to determine the authorization level for the operator based on predetermined criteria indicated by the authorization control data. Based on a look-up of the operator authorization information in the authorization control data, certain operators may only be authorized to control certain operations of the lift gate and not other operations, while certain operators may be authorized to control all operations of the lift gate, and still other operators may not be authorized to operate the lift gate at all.

For example, based on the look-up of the operator authorization information in the authorization control data, certain operators may be authorized to raise/lower/fold/unfold the lift gate and perform diagnostic operations on the lift gate (such as obtain operation history/status accumulated by the main lift controller), while other operators may be authorized to only raise/lower the lift gate and raise/lower the lift platform, while other operators may be authorized to only raise/lower the lift platform, etc.

As such, the authorization control data 34 may be configured as needed to provide different authorization levels for authorizing a variety of types of operator actions. The authorization check module 31 is further configured for determining an authorization level for the operator based on the authorization information the operator provides, wherein the authorization level indicating the types of lift gate operations the operator is authorized to perform on the lift gate by commanding the wireless control assembly 14.

Upon determining the authorization level for the operator, the authorization check module 31 then provides the authorization level information for the operator to a command communication module (CCM) 33. Then, control commands input by the operator into the operator interfaces 27, 29 and auxiliary switch (AS) 15, are selectively sent to the to the main lift controller 23 (FIG. 2) by the CCM 33 based on authorization level information. The main lift controller 23 functions as a receiver for the commands sent by the CCM 33 for controlling a comprehensive set of lift operations (such as platform up/down, lift fold/unfold, etc.). The CCM 33 communicates with the main lift controller 23 wirelessly via the wireless transceivers 24 and 25.

Figure 4:
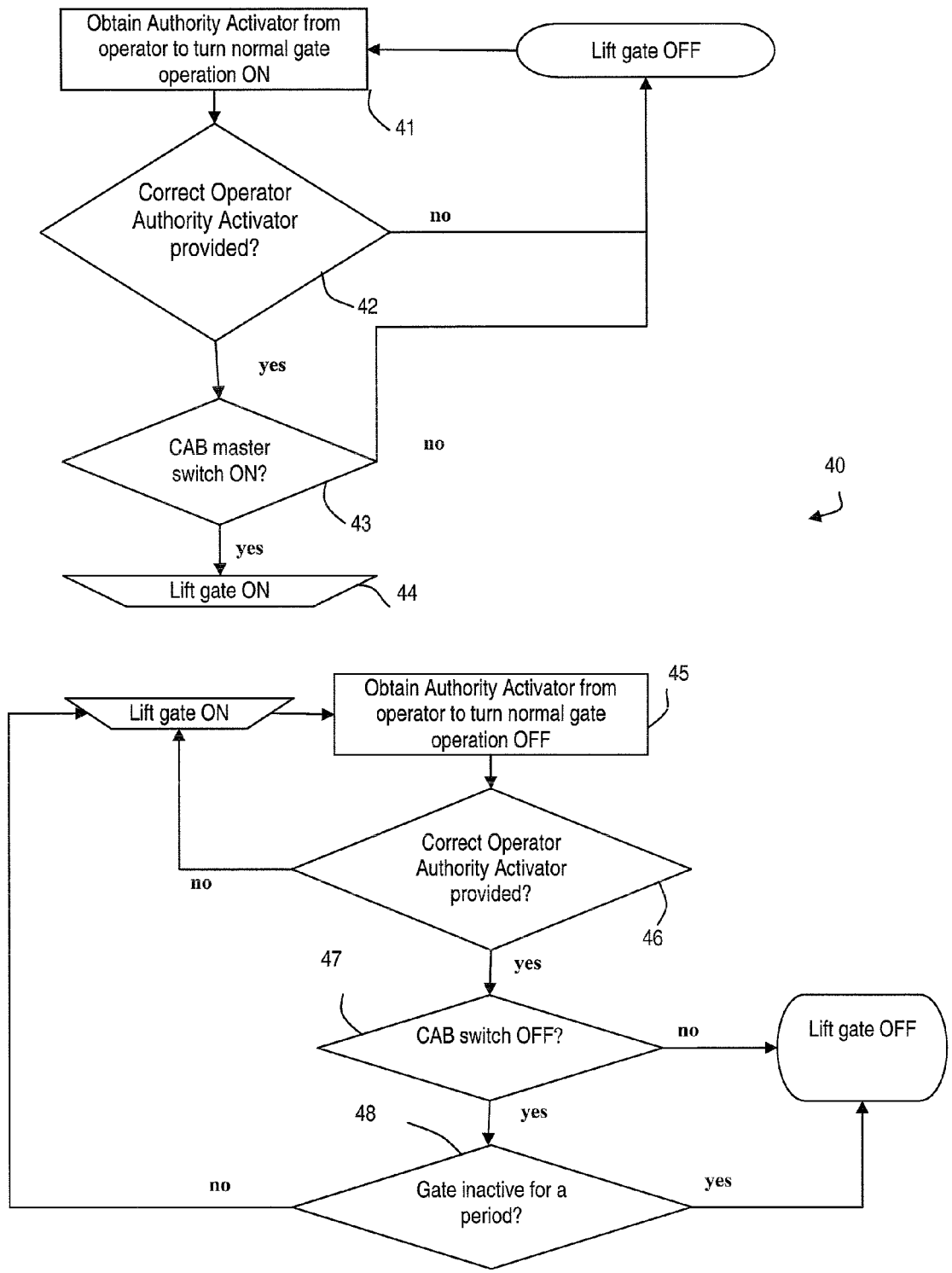
FIGS. 4-5 show flowcharts of processes for controlling operation of a lift gate using the lift gate assembly as controlled by a wireless control assembly, according to an embodiment of the invention.
Figure 5:
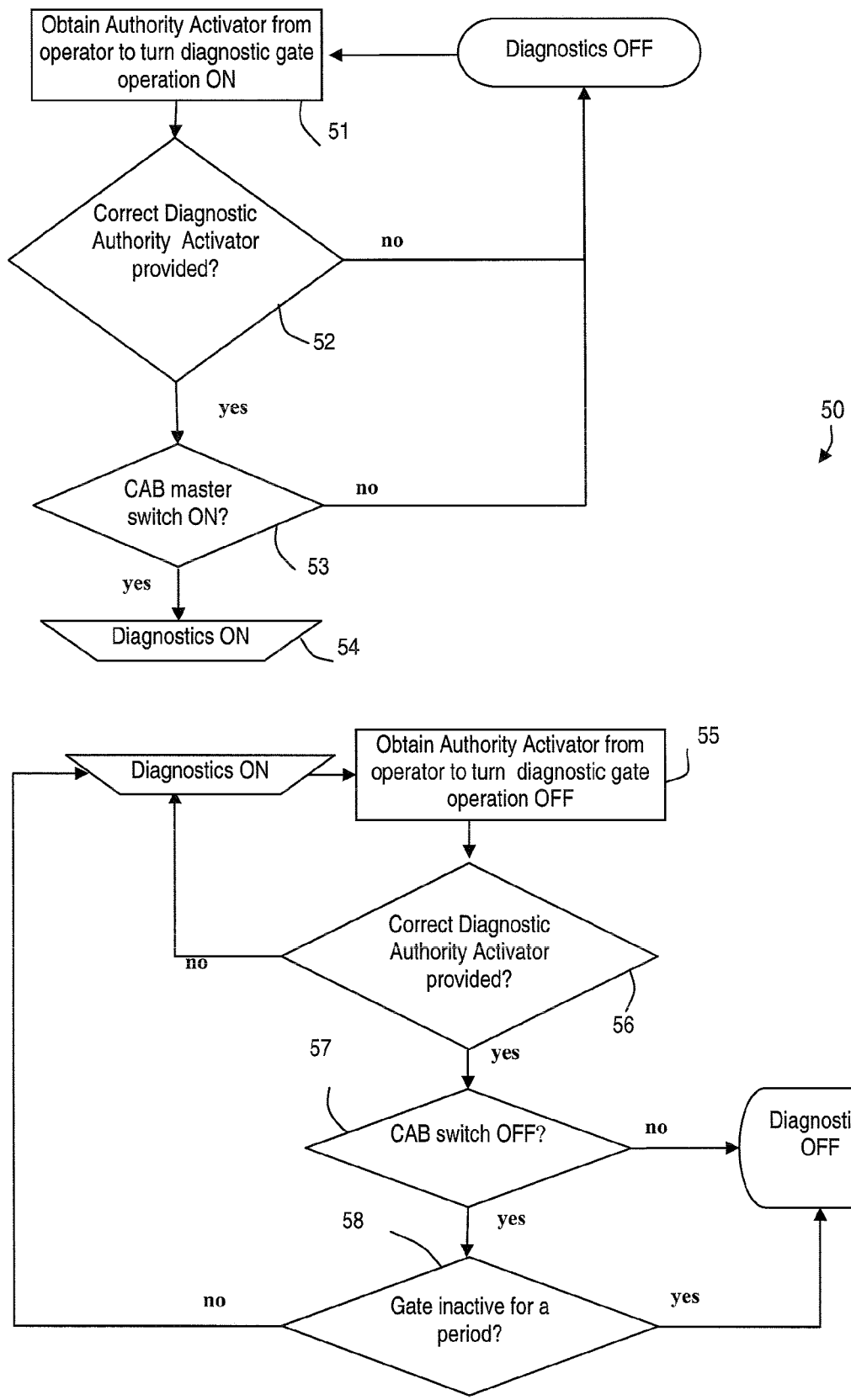

FIGS. 4-5 show flowcharts of processes for controlling operation and motion of a lift gate using the lift gate assembly 11 as controlled by a wireless control assembly 14, according to an embodiment of the invention.

The following definitions aid in understanding the processes depicted in FIGS. 4-5 and described further below:

Cut off switch: A master switch in the vehicle cabin which completely turns ON/OFF power to the lift gate. When in the OFF position, the lift gate is non-operational. For example, in FIG. 2, the cut off switch 16 wirelessly communicates its OFF position to the main lift controller 23 (via wireless transceivers 24 and 25) wherein the main lift controller 23 disables power to the lift gate.

Authority Activator: Allows the operator to demonstrate to the authority check module 31 that the operator is authorized to interact with the lift gate. The authority check module 31 uses the Authority Activator to determine the extent or type of interaction the operator is allowed to have with the lift gate. The Authority Activator may be of different types. For example, a Diagnostics Authority Activator may be used by a technician to service the lift. Other types of Authority Activators may be used for different types of interactions with the lift gate (e.g., an Operator Authority Activator is used by a lift operator). The Authority Activator can comprise, for example, a key, cardkey, information entered on a keypad, a signal of particular frequency. The operator provides the Authority Activator to the operator interface (e.g., modules 27 and/or 28 in FIG. 2). When the operator interface is wireless (e.g., operator interface 29 or auxiliary switch 15), it may be battery powered in which case it can be located by the operator within R/F range of the lift gate for controlling the lift gate.

Gate function switch: This switch function is implemented by the main lift controller 23 for controlling movement of the lift gate up/down, fold/unfold. The operator may send control commands to the main lift controller module 23 via the wireless control assembly 14, as described above.

Diagnostic display: The diagnostic display comprises a display (DSP) interface 13 (FIG. 1) for the main lift controller 23 to show status of the lift gate (e.g., operation history, operational condition, etc.). The DSP 13 can be series of LEDs, an LCD display screen, etc., for communication information to an operator. The operator interface modules 27 and/or 28 may also include such displays.

Remote auxiliary switch: This is a switch (e.g., switch 15, FIG. 1) allowing wireless platform up/down operations, activated when the Master Switch is on and Authority Activator is provided.

In this embodiment, the lift gate can have multilevel activation, wherein not only the operator must provide authorization information that is checked (e.g., by the authorization controller 26) to authenticate the operator, but also one or more other conditions must be satisfied (e.g., as checked by the authorization controller 26 and/or main lift controller 23), before an authorized operator can operate the lift gate.

For example, for a lift operator, as a first condition, the lift operator is required to provide an Authority Activator (e.g., a code on a key pad, or has the proper wireless key fob), demonstrating that the lift operator is authorized to start-up the lift gate or turn the lift gate ON for operation. In addition, as a second condition, the lift gate will only start-up if the cut off switch is set to ON to enable the lift gate.

For a maintenance technician operator, as a first condition, the maintenance technician operator is required to provide an Authority Activator demonstrating the technician operator is authorized to start-up the lift gate and perform diagnostics operations. In addition, as a second condition, the lift gate will only start-up if the cut off switch is set to ON to enable the lift gate.

The Authority Activator is checked by the authorization check module 31 and if the Authority Activator for the operator is authenticed based on the authorization control data 34, and if the cut off switch is ON, then the operator may interact with the lift gate based on an authorization level provided by the authorization check module 31.

FIG. 4 shows a process 40 wherein normal (non-diagnostic operation) interaction with the lift gate by an operator requires both authentication of an Operator Authority Activator from the operator and that the CAB Switch to be ON. The process 40 begins with the lift gate in the OFF state. In step 41, the wireless control assembly requires the operator to provide an Operator Authority Activator to turn normal lift gate operation ON. In step 42, the authorization controller determines if the operator provided an authentic Operator Authority Activator. If not, the lift gate remains OFF, otherwise the process proceeds to step 43. In step 43, it is determined if the CAB Master Switch is ON (e.g., this may be checked by the authorization controller 26 and/or main lift controller 23). If not, the lift gate remains OFF, otherwise the process proceeds to step 44 wherein the lift gate is turned ON for normal operation and the operator may interact with the gate.

At a later time, steps 45-48 of process 40 implement turning the lift gate OFF from a lift gate ON state. In step 45, the wireless control assembly requires the operator to provide an Operator Authority Activator to turn normal lift gate operation OFF. In step 46, it is determined if the operator provided a proper Operator Authority Activator to turn the lift gate OFF. If yes, the lift gate is turned OFF, otherwise in step 47 it is determined if the CAB Master Switch is OFF. If not, then the lift gate is turned OFF. Otherwise in step 48 if the lift gate remains inactive (latent) for a period of time (e.g., 30 seconds), then the lift gate is turned OFF automatically. Otherwise the lift gate remains ON.

According to another embodiment, in process 40 steps 43 and/or 47 for checking a CAB Switch may be optional (or not used at all). Yet in another embodiment steps 42 and/or 46 for checking an Authority Activator may be optional (or not used at all).

FIG. 5 shows a process 50 wherein diagnostic operation interaction with the lift gate by an operator requires both authentication of a Diagnostic Authority Activator from the operator and that the CAB Switch to be ON. The process 50 begins with the lift gate ("gate") in the diagnostic OFF state. In step 51, the wireless control assembly requires the operator to provide a Diagnostic Authority Activator to turn diagnostic lift gate operation ON. In step 52, the authorization controller determines if the operator provided an authentic Diagnostic Authority Activator. If not, the lift gate remains in diagnostic OFF state, otherwise the process proceeds to step 53. In step 53, it is determined if the CAB Master Switch is ON (e.g., this may be checked by the authorization controller 26 and/or main lift controller 23). If not, the lift gate remains in a diagnostic OFF state, otherwise the process proceeds to step 54 wherein the lift gate is turned transitioned into diagnostic operation and the operator may interact with the gate.

At a later time, steps 55-58 of process 50 implement turning the diagnostic OFF from an ON state. In step 55, the wireless control assembly requires the operator to provide a Diagnostic Authority Activator to turn normal lift gate operation OFF. In step 56, it is determined if the operator provided a proper Diagnostic Authority Activator to turn the diagnostic state OFF. If yes, the diagnostic is turned OFF, otherwise in step 57 it is determined if the CAB Master Switch is OFF. If not, then the diagnostic is turned OFF. Otherwise in step 58 if the lift gate remains inactive (latent) for a period of time (e.g., 30 seconds), then the diagnostic is turned OFF automatically. Otherwise the diagnostic remains ON.

According to another embodiment, in process 50 steps 53 and/or 57 for checking a CAB Switch may be optional (or not used at all). Yet in another embodiment steps 52 and/or 56 for checking a Diagnostic Authority Activator may be optional (or not used at all).

According to certain embodiments of the invention implementing multilevel activation, not only the operator must provide authorization information that is checked (e.g., by the authorization controller 26) to authenticate the operator, but one or more other conditions (e.g., cut off or cab switch is ON, lift actuator temperature is normal) that must also be satisfied (e.g., as checked by the authorization controller 26 and/or main lift controller 23) before an authorized operator can operate the lift gate.

As such, the lift gate may have multilevel activation such as requiring multiple conditions to be satisfied (e.g., checked by the main lift controller 23 and/or the authorization controller 26) before the lift gate can be interacted with. In one example, the above operation processes according to embodiments of the invention (e.g., processes 40 and 50) may be implemented by the authorization controller 26 only. In another example, the main lift controller 23 and the authorization controller 26 are configured to cooperate in implementing the above processes.

The main lift controller 23 and the authorization controller 26 are configured such that each controller checks satisfaction of certain conditions before an operator can operate the lift gate. In one example, the authorization controller 26 may be configured to receive and check Authority Activator information and also check status of the cut off switch, while the main lift controller 23 checks certain operation parameters or lift states (e.g., cut off switch ON/OFF, sensed lift states including whether the lift is fully extended, partially extended, or in a completely closed (tucked) position, motion of the lift platform, load applied to the lift platform, lift actuator temperature, wait time for recharging a hydraulic lift pump, number of cycles of operation of the lift, etc.).

For example, the wireless control assembly module 14 and/or main lift controller module 11 may be configured for enabling a motion of the lift gate based on authenticated operator input commands when the one or more of conditions are satisfied. The modules 11, 14 may be further configured for providing notification of said one or more conditions, and/or for providing notification when said one or more conditions are not satisfied. In one implementation, the one or more conditions include one or more operational parameters comprising lift gate states such as one or more sensed lift gate states described above.

The wireless control assembly module 14 and/or main lift controller module 11 may be further configured for determining whether the input commands follow a proper sequence, determining whether the one or more conditions are satisfied, and controlling the motion of the lift gate within operational limits of the lift. When the lift gate is disposed on a vehicle (such as at the back of a truck in FIG. 1), the one or more conditions can include one or more of: whether the vehicle is properly parked, whether the operator is off a deck/platform of the lift gate, whether the operator is clear of a projected motion path of the lift gate, etc.

According to the embodiment implementing another multilevel activation, not only the operator must provide authorization information that is checked (e.g., by the authorization controller 26) to authenticate the operator, but one or more other conditions must also be satisfied (e.g., as checked by the authorization controller 26 and/or main lift controller 23), whereby the system determines the types of operations this operator is permitted to perform (e.g., different operators may have different operation permissions), before the authorized operator can operate the lift gate to perform permitted operations.

Figure 6:
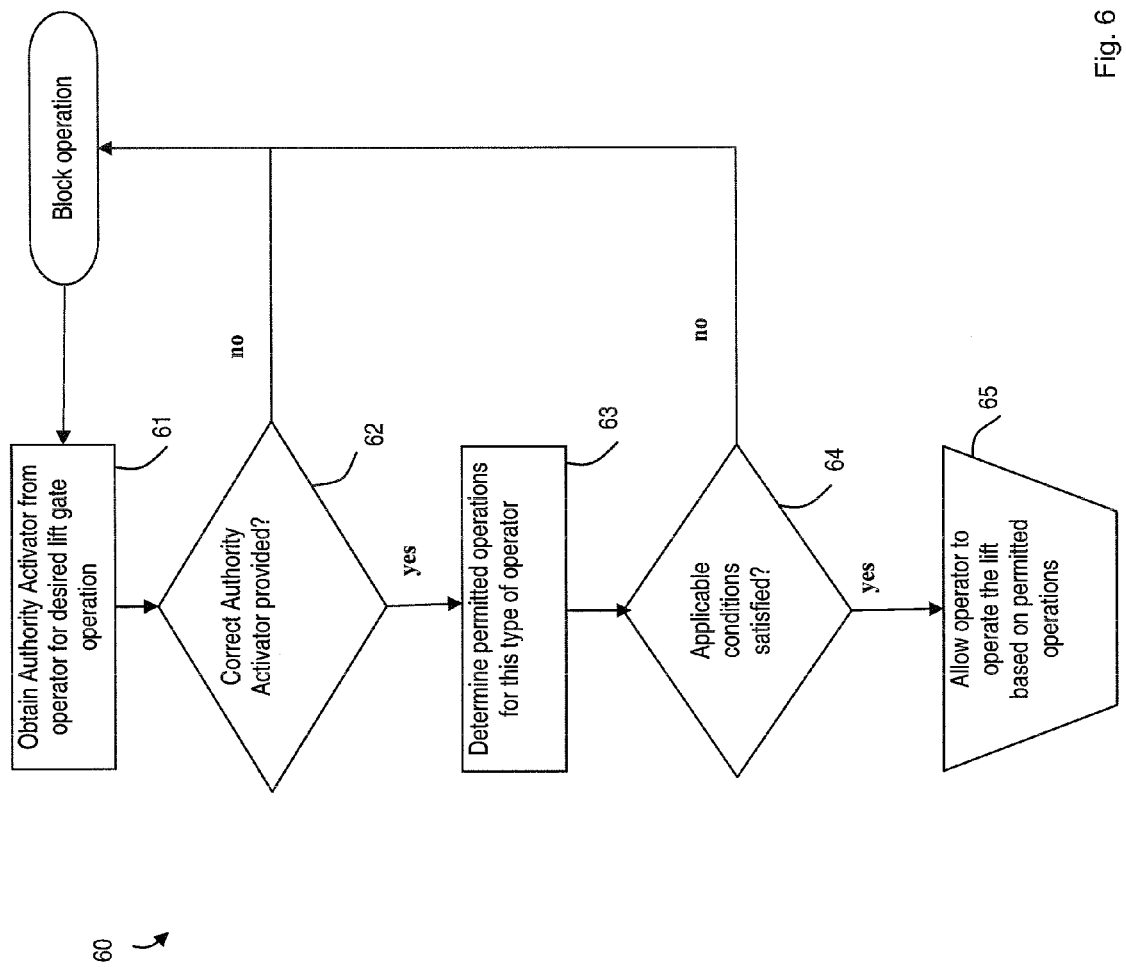
FIG. 6 shows a flowchart of a process for controlling operation of a lift gate using the lift gate assembly as controlled by a wireless control assembly, according to another embodiment of the invention.

FIG. 6 shows a flowchart of a process 60 for controlling operation of a lift gate using the lift gate assembly as controlled by a wireless control assembly 14, according to such embodiment of the invention. The process 60 begins with the lift gate in the blocked state wherein it cannot be operated without proper authorization. In step 61, the wireless control assembly 14 requires the operator to provide an appropriate Authority Activator for the lift operations the operator desires to perform. The operator may optionally be also asked to enter identification information. In step 62, the authorization controller 26 determines if the operator provided an authentic Authority Activator. If not, lift gate operation remains blocked, otherwise the process proceeds to step 63 wherein the authorization controller 26 accesses the authorization control data 34 to determine the lift gate operations the operator is permitted to performed.

For example, the authorization controller 26 may determine that based on the Authority Activator type provided by the operator, the operator may perform a typical set of operations on the lift gate (e.g., diagnostic operations). Additionally, the authorization controller 26 may determine that based on the identification information provided by the operator, that this particular operator is permitted to perform more than (or less than) the typically permitted operations compared to operators who provide the same type of Authority Activator.

In step 64, it is determined if the one or more required conditions are satisfied (e.g., this may be checked by the authorization controller 26 and/or main lift controller 23 as discussed above). If not, the lift gate operations remain blocked, otherwise the process proceeds to step 65 wherein the operator may enter comments into the operator interface modules 27, 29 or auxiliary switch 15 to operate the lift gate.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. For example, as shown in the drawings (e.g., FIGS. 1-2, 6), at least the functions of the wireless control assembly 14, the main lift controller 23, the lift actuator control interface 22, the operator interfaces 27 and 29, may comprise program code instructions for execution by a processor, software modules, microcode, computer program product on computer readable media, logic circuits, application specific integrated circuits, firmware, etc. As those skilled in the art will recognize the various wireless transceivers may be selected based on desired radio frequency range and environmental factors such as interference, and the like.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system. The wireless protocol for communication between the various modules may comprise protocols such as IEEE 802.11, Bluetooth, Personal Area Network, control signals at different frequencies reflecting different tunable signals, FM, AM, packet communication, TCP/IP and other technologies which those skilled in the art recognize.

Generally, the term "computer-readable medium," as used herein, refers to any medium that participated in providing instructions to a processor for execution. Such a medium may take many forms, including but not limited to, non-volatile media, volatile media and transmission media. Non-volatile media includes, for example, optical or magnetic disks, such as a storage device, Volatile media includes dynamic memory, such as a main memory. Transmission media includes coaxial cables, copper wire and fiber optics, including the wires that comprise a bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A lift gate system, comprising:
a lift gate assembly including an actuator for actuating a lift gate, a main controller configured for controlling the actuator, and a wireless transceiver for receiving an operation command;
a wireless controller including an authorization controller configured for receiving authorization information from an operator and checking the authorization information against authorization control data to determine if the operator is authorized to operate the lift gate; and
the wireless controller configured such that upon authorization of the operator by the authorization controller, the wireless controller wirelessly transmits an authorized operator command to the main controller for controlling operation of the lift gate accordingly, wherein the main controller receives the authorized operator command and performs a lift gate operation authorized by the authorization controller of the wireless controller.

2. The system of claim 1 further comprising an operator human interface device for receiving authorization information from the operator and communicating the authorization information to the authorization controller, wherein the authorization controller is further configured for checking the authorization information against authorization control data to determine if the operator is authorized to operate the lift gate.

3. The system of claim 2 wherein the operator human interface device comprises a remote wireless interface device including user input/output modules and a transceiver for wirelessly communicating with the wireless controller.

4. The system of claim 2 wherein the authorization control data is stored in a memory device of the wireless controller.

5. The system of claim 2 wherein the authorization information includes one or more of: an indication of a code entered on a key pad, an indication of unlocking of a lock by a key, an indication of swiping of an information card on a card reader, and an indication of receiving a specific wireless signal from a wireless transmitter.

6. The system of claim 2 wherein the authorization controller is further configured for determining an authorization level for the operator based on the received authorization information, the authorization level indicating the types of lift gate operations the operator is authorized to perform on the lift gate by commanding the wireless controller.

7. The system of claim 6 wherein:
the authorization controller is further configured to check that one or more conditions are satisfied; and
the wireless controller is further configured such that upon authorization of the operator by the authorization controller, and satisfaction of said one or more conditions, the wireless controller wirelessly transmits the operator command to the main controller for controlling operation of the lift gate accordingly.

8. The system of claim 2 wherein:
the main controller is further configured to check that one or more conditions are satisfied, and upon satisfaction of said one or more conditions, then upon receiving a command from the wireless controller the main controller controls operation of the lift gate accordingly.

9. The system of claim 2 further including a wireless auxiliary switch configured for wirelessly receiving an authorized operator command from the wireless controller for controlling up/down motion of a lift platform via the actuator.

10. A control device for operating a lift gate assembly including a lift gate assembly including an actuator for actuating a lift gate, a main controller configured for controlling the actuator, and a wireless transceiver for receiving an operation command, the control device comprising:
a wireless controller including an authorization controller configured for receiving authorization information from an operator and checking that an operator is authorized to operate the lift gate; and
the wireless controller configured such that upon authorization of the operator by the authorization controller, the wireless controller wirelessly transmits an authorized operator command to the main controller for controlling operation of the lift gate accordingly, wherein the main controller receives the authorized operator command and performs a lift gate operation authorized by the authorization controller of the wireless controller.

11. The control device of claim 10 further comprising an operator human interface device for receiving authorization information from the operator and communicating the authorization information to the authorization controller, the authorization controller further configured for checking the authorization information against authorization control data to determine that the operator is authorized to operate the lift gate.

12. The control device of claim 11 wherein the operator human interface device comprises a remote wireless interface device for wirelessly communicating with the wireless controller.

13. The control device of claim 11 wherein the authorization information includes one or more of: an indication of a code entered on a key pad, an indication of unlocking of a lock by a key, an indication of swiping of an information card on a card reader, and an indication of receiving a specific wireless signal from a wireless transmitter.

14. The control device of claim 11 wherein the authorization controller is further configured for determining an authorization level for the operator from the authorization control data based on the received authorization information, the authorization level indicating the types of lift gate operations the operator is authorized to perform on the lift gate by commanding the wireless controller.

15. The control device of claim 14 wherein:
the authorization controller is further configured to check that one or more conditions are satisfied; and
the wireless controller is further configured such that upon authorization of the operator by the authorization controller, and satisfaction of said one or more conditions, the wireless controller may wirelessly transmit the operator command to the main controller for controlling operation of the lift gate accordingly.

16. The control device of claim 11 wherein:
the main controller is further configured to check that one or more conditions are satisfied, and upon satisfaction of said one or more conditions, then upon receiving a command from the wireless controller the main controller controls operation of the lift gate accordingly.

17. The control device of claim 11 wherein the wireless controller is portable.

18. A method of operating a lift gate assembly including a lift gate assembly including an actuator for actuating a lift gate, a main controller configured for controlling the actuator, and a wireless radio frequency transceiver for receiving an operation command, the method comprising:
receiving authorization information from an operator via a human interface device and checking that the operator is authorized to operate the lift gate; and
upon authorization of the operator, wirelessly transmitting an authorized operator command to the main controller via radio frequency signals for controlling operation of the lift gate accordingly, wherein the main controller receives the authorized operator command and performs a lift gate operation authorized by the authorization controller of the wireless controller.

19. The method of claim 18 further including receiving authorization information from the operator, and checking the authorization information against authorization control data in a storage device to determine that the operator is authorized to operate the lift gate, the authorization control data comprises multiple data entries wherein each entry relates to a corresponding operator, such that operator provided authorization information is checked against authorization data codes in the control data for a match, and if a match is found, then the operator may perform permitted lift gate operations.

20. The method of claim 19 wherein the authorization information includes one or more of: an indication of a code entered on a key pad, an indication of unlocking of a lock by a key, an indication of swiping of an information card on a card reader, and indication of receiving a specific wireless signal from a wireless transmitter.

21. The method of claim 19 wherein the control data is stored on a remote database.

22. The method of claim 19 further including determining an authorization level for the operator based on the authorization information, the authorization level indicating the types of lift gate operations the operator is authorized to perform on the lift gate by commanding the wireless controller.

23. The method of claim 22 further including:
checking that one or more conditions are satisfied;
upon authorization of the operator, and satisfaction of said one or more conditions, wirelessly transmitting the operator command to the main controller for controlling operation of the lift gate accordingly.

24. The method of claim 19 further including:
checking that one or more conditions are satisfied, and upon satisfaction of said one or more conditions, then upon wirelessly receiving a command, the main controller controlling operation of the lift gate accordingly.

25. The method of claim 19 further including providing a wireless auxiliary switch configured for wirelessly receiving an authorized operator command for controlling up/down motion of a lift platform via the actuator.

26. The system of claim 1, further comprising:
a cut off switch movable between an on position and an off position, such that the cut off switch:
enables operation of the lift gate assembly when the cut off switch is in the on position; and
disables operation of the lift gate assembly when the cut off switch is in the off position.

27. The system of claim 26, wherein the cut off switch must be in the on position before the wireless controller wirelessly transmits the authorized operator command to the main controller for controlling operation of the lift gate.

28. The system of claim 26, wherein the cut off switch must be in the on position before the main controller controls operation of the lift gate.

29. The system of claim 1, wherein the authorization controller of the wireless controller is further configured for determining the types of lift gate operations that the operator is authorized to perform based on the location of the operator relative to the lift gate, the position of the lift gate, and the lift state of the lift gate.

30. The system of claim 1, wherein the main controller is further configured for determining the types of lift gate operations that the operator is authorized to perform based on the location of the operator relative to the lift gate, the position of the lift gate, and the lift state of the lift gate.

31. The system of claim 1, wherein the authorized operator command controls an operation of the lift gate that the operator is permitted to perform.

32. The system of claim 1, wherein the main controller performs all lift gate operations authorized by the authorization controller of the wireless controller.

* * * * *